(12) United States Patent
Laslo

(10) Patent No.: US 8,663,586 B1
(45) Date of Patent: Mar. 4, 2014

(54) HIGH PERFORMANCE MERCURY CAPTURE

(71) Applicant: ALSTOM Technology Ltd, Baden (CH)

(72) Inventor: Dennis James Laslo, Ten Mile, TN (US)

(73) Assignee: ALSTOM Technology Ltd (CH)

( * ) Notice: Subject to any disclaimer, the term of this patent is extended or adjusted under 35 U.S.C. 154(b) by 0 days.

(21) Appl. No.: 13/875,818

(22) Filed: May 2, 2013

Related U.S. Application Data

(60) Provisional application No. 61/680,490, filed on Aug. 7, 2012.

(51) Int. Cl.
*B01D 53/64* (2006.01)
*B01D 53/74* (2006.01)
*B01D 53/81* (2006.01)

(52) U.S. Cl.
USPC ............ 423/210; 422/168; 422/169; 422/170; 422/171; 422/172; 422/177; 96/134; 95/134

(58) Field of Classification Search
USPC .......... 423/210; 422/168, 169, 170, 171, 172, 422/177; 96/134; 95/134
See application file for complete search history.

(56) References Cited

U.S. PATENT DOCUMENTS

| | | | |
|---|---|---|---|
| 5,505,766 A | | 4/1996 | Chang |
| 5,507,238 A | * | 4/1996 | Knowles ................... 110/245 |
| 2004/0247509 A1 | * | 12/2004 | Newby .................... 423/240 S |
| 2005/0039598 A1 | | 2/2005 | Srinivasachar et al. |
| 2008/0060519 A1 | | 3/2008 | Maly et al. |
| 2009/0158929 A1 | | 6/2009 | Lindau |
| 2010/0018395 A1 | | 1/2010 | Srinivasachar et al. |
| 2011/0262327 A1 | | 10/2011 | Dillon et al. |
| 2011/0289923 A1 | | 12/2011 | Bittner et al. |

OTHER PUBLICATIONS

European Search Report for EP13178273.2 dated Nov. 18, 2013.

* cited by examiner

*Primary Examiner* — Timothy Vanoy
(74) *Attorney, Agent, or Firm* — Rita D. Vacca

(57) ABSTRACT

A method and system for high performance mercury capture from solid fuel combustion flue gas is provided. The method includes injecting pulverized activated carbon into a mercury capture system with at least a first and a second fabric filter, collecting the pulverized activated carbon captured in the second fabric filter, and injecting the collected pulverized activated carbon from the second fabric filter upstream of the first fabric filter for reuse to capture mercury from the process gas.

15 Claims, 2 Drawing Sheets

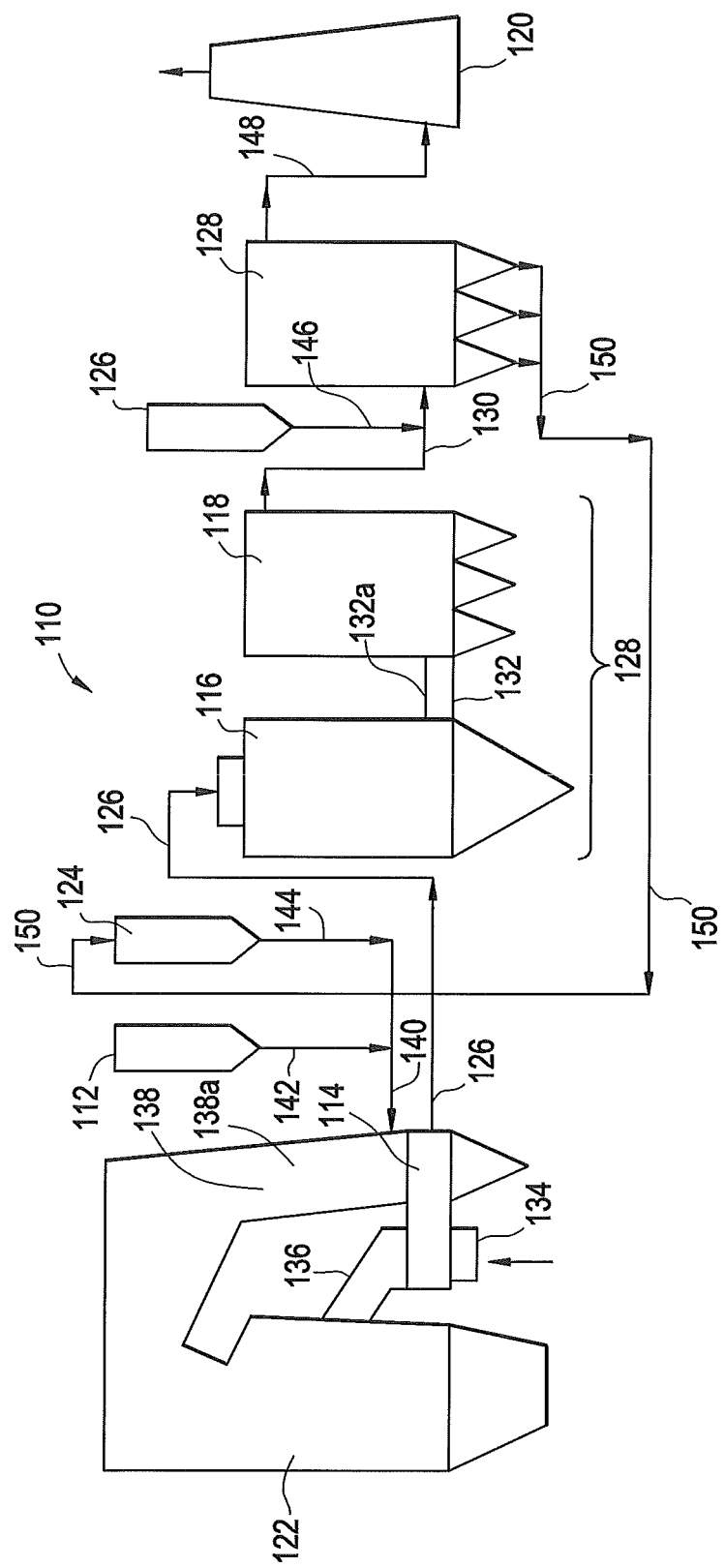

HIGH PERFORMANCE MERCURY CAPTURE

CROSS-REFERENCE TO RELATED APPLICATION

This application claims the benefit of U.S. Provisional Patent Application Ser. No. 61/680,490; filed on Aug. 7, 2012, entitled "HIGH PERFORMANCE MERCURY CAPTURE" which is incorporated herein by reference in its entirety.

FIELD OF THE INVENTION

The present invention relates to a system and a method for removing mercury from the products of solid fuel combustion including flue gases, and more particularly, to a system and a method for removing elemental mercury or mercury compounds from flue gases produced by coal combustion.

BACKGROUND OF THE INVENTION

The use of activated carbon for the adsorption of mercury vapor has been successfully demonstrated in various applications such as municipal waste incineration. However, there are significant differences in the concentration of mercury from waste incinerator flue gas as compared to coal-fired power plant flue gas, with the concentration of mercury from the coal-fired power plants being anywhere from 10 to 100 times lower. Also, the flue gas mercury from waste incinerators is usually in the form of mercury chloride whereas the flue gas mercury from coal-fired power plants is usually in the form of elemental mercury. Both of these differences make it more difficult to remove mercury from flue gas produced by a coal-fired power plant.

The utilization factor for activated carbon is important as it is costly. Efforts in the industry to reduce carbon costs include halogenating the carbon—usually with bromides. Also, the carbon can be ground to reduce the surface area of the carbon particles and/or injected into the system at higher temperatures, each measure taken for purposes of increasing the carbon's utilization factor. However, even with these industry efforts, compliance with more stringent emission regulations requires increased carbon injection rates.

On Dec. 16, 2011, the United States Environmental Protection Agency (U.S. EPA) issued new more stringent emission regulations for mercury and other air pollutants for both existing and new power plants. The new emission regulation for mercury produced by new power plants not firing low-rank coal is $2.0 \times 10^{-4}$ pounds of mercury per gigawatt hour (lb mercury/GWh). Accordingly, a need exists for high performance mercury capture for purposes of achieving regulatory compliance, while minimizing additional costs associated therewith.

SUMMARY OF THE INVENTION

An object of the present invention is to provide a method for high performance mercury capture for coal-fired power plants using pulverized activated carbon in a system equipped with two or more fabric filters for purposes of achieving regulatory compliance. As such, the method comprises injecting pulverized activated carbon into the system ductwork at a point upstream of the second fabric filter for mercury capture, collecting the pulverized activated carbon from the last fabric filter, and conveying the collected pulverized activated carbon countercurrent to the flow of flue gas through the system for injection at a point upstream of the first fabric filter for system reuse in mercury capture.

Another object of the present invention is to provide a system for high performance mercury capture for coal-fired power plants using pulverized activated carbon in the system. The system comprises a desulfurization spray dryer absorber, at least a first fabric filter, a second fabric filter, and ductwork arranged for recycling pulverized activated carbon collected from the second fabric filter for reinjection into the system countercurrent to the gas flow upstream of the first fabric filter.

The method and system for high performance mercury capture described above, allows for high performance mercury capture with 99.8 percent or greater mercury capture from coal-fired power plant flue gas, as required to meet new U.S. EPA regulations. As such, in the presently described system, over 90 percent of flue gas mercury is captured in the first fabric filter, and most of the remaining flue gas mercury is captured in the second or last fabric filter. Since the amount of mercury remaining in the flue gas after the first fabric filter is relatively low, the remaining amount of mercury absorbed on the activated carbon and captured in the second or last fabric filter is relatively little. With only very low levels of mercury available for capture, much of the pulverized activated carbon from the second or last fabric filter remains active and capable of removing additional mercury. Hence, the still active pulverized activated carbon removed from the second or last fabric filter is ideal for re-use in the system's first fabric filter.

Other objects and advantages of the present invention will become apparent from the drawings and detailed description thereof provided below.

BRIEF DESCRIPTION OF THE DRAWINGS

The present invention may be better understood and its numerous objects and advantages apparent to those skilled in the art by reference to the accompanying drawings in which:

FIG. 2 is a schematic diagram of a high performance mercury capture system of the present invention.

DETAILED DESCRIPTION OF THE PREFERRED EMBODIMENT

Figure 1:
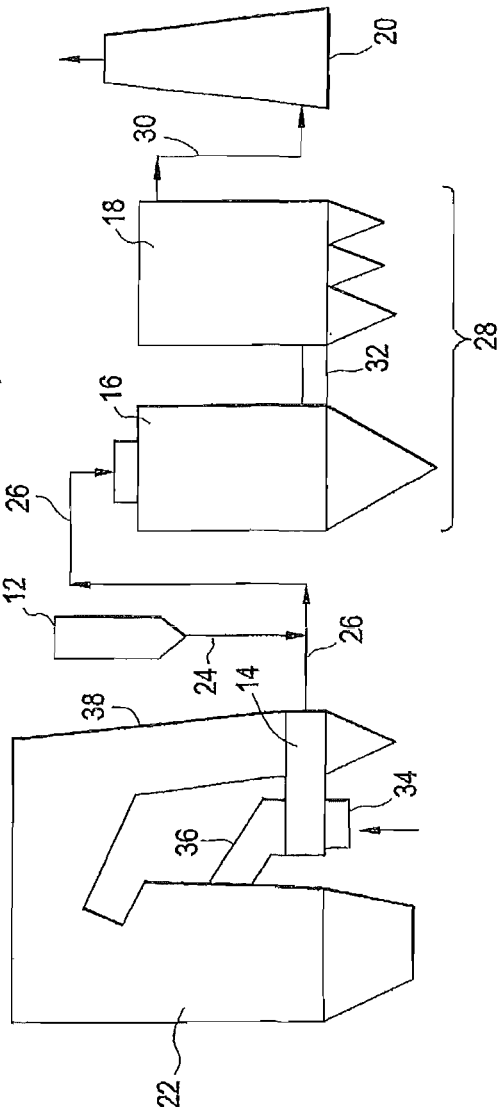
FIG. 1 is a schematic diagram of a prior art mercury capture system.

The present invention relates to a system and a method for removing elemental mercury and/or mercury compounds from the products of solid fuel combustion including flue gas, and more particularly, to a system and a method for removing elemental mercury and/or mercury compounds from flue or process gas produced by coal combustion, such as from a coal-fired power plant.

One common coal in the United States is subbituminous coal, typically from the Powder River Basin, commonly referred to as PRB coal. PRB coal can have mercury contents of about 10 pounds per trillion British thermal units (lb/TBtu). To meet the United States Environmental Protection Agency (U.S. EPA) regulations for new power plants, the mercury capture equipment or system needs to capture or remove over 99.8 percent of the mercury present in the flue gas. Current mercury emission regulations are less stringent requiring about 1.2 lb/TBtu, or a little less than 90 percent removal of the mercury present in the flue gas.

A prior art system useful to achieve approximately 90 percent mercury capture is illustrated as system 10 in FIG. 1. System 10 includes a boiler 22 powered by combustion of a solid fuel such as coal. For purposes of such combustion, air enters inlet 34 of air preheater 14 and flows through duct 36 fluidly connected thereto and to boiler 22. As a result of such combustion, a combustion product, flue gas, flows from boiler 22 through fluidly connected exit duct 38 to a fluidly connected air preheater 14. After the flue gas flows through air preheater 14, pulverized activated carbon (PAC) from a PAC supply 12 is introduced via fluidly connected duct 24 into the flow of flue gas through fluidly connected duct 26. In addition to being fluidly connected to duct 24, duct 26 is likewise fluidly connected to and between air preheater 14 and desulfurization spray dryer absorber 16. PAC supply 12 is arranged between air preheater 14 and desulfurization spray dryer absorber 16 so as to be downstream of air preheater 14 and upstream of desulfurization spray dryer absorber 16 with respect to the flow of flue gas through system 10. From its introduction into duct 26, PAC is conveyed through system 10 along with the flow of flue gas to a desulfurization unit 28 comprising desulfurization spray dryer absorber 16 and fabric filter 18. Desulfurization spray dryer absorber 16 and fabric filter 18 are fluidly connected by means of duct 32. Mercury present in the flue gas is absorbed by the PAC prior to PAC capture in fabric filter 18. After the PAC is captured in fabric filter 18, the resultant cleaned gas with approximately 90 percent mercury removal therefrom flows out of fabric filter 18 through a fluidly connected duct 30 to a stack 20. As such, the cleaned gas flows through stack 20 for release to the atmosphere. While system 10 is effective for removing approximately 90 percent of the mercury present in flue gases from a coal-fired power plant as stated, it is ineffective for purposes of meeting new U.S. EPA mercury emission regulations.

Illustrated in FIG. 2 is a system 110 for high performance mercury capture from flue gas produced by a coal-fired power plant useful to capture greater than 90 percent of flue gas mercury, and more particularly, to capture approximately 99.8 percent flue gas mercury or greater. System 110 comprises a boiler 122 for combustion of a solid fuel, such as PRB coal or the like. For purposes of such combustion, air enters inlet 134 of air preheater 114 and flows through duct 136 fluidly connected thereto and to boiler 122. Flue gas produced by the solid fuel combustion of boiler 122 flows from boiler 122 through fluidly connected exit duct 138 to fluidly connected air preheater 114. The air preheater 114 is operative both for heating air entering inlet 134 prior to the air reaching boiler 122, and for cooling the flue gas flowing from boiler 122 prior to flow through fluidly connected duct 126.

When system 110 is in use, fresh PAC from a fresh PAC supply 112 and recycled PAC from a recycled PAC supply 124 are conveyed to exit duct 138 prior to air preheater 114. As such, fresh PAC flows from fresh PAC supply 112 through fluidly connected duct 142 to fluidly connected duct 140, which is fluidly connected to exit duct 138. Likewise, recycled PAC flows from recycled PAC supply 124 through fluidly connected duct 144 to fluidly connected duct 140, where both the fresh PAC and the recycled PAC are introduced at contact point 138a into the flow of flue gas through exit duct 138 prior to the flue gas reaching air preheater 114. The temperature of the flue gas at contact point 138a prior to reaching air preheater 114 is from 400° F. to 1100° F.

Introducing the PAC at a temperature within the 400° F. to 1100° F. range increases the PAC absorption efficiency. As an alternative to PAC introduction in exit duct 138, the fresh PAC and the recycled PAC may be introduced in duct 126 upon modifications in the ductwork to fluidly connect ducts 142 and 144 with duct 126 (not shown). However, by moving PAC introduction from exit duct 138 to duct 126, PAC absorption efficiency may be diminished due to temperature differences between that in exit duct 138 and that in duct 126. If PAC absorption efficiency is so diminished, costs associated therewith increase. Accordingly, although PAC introduction in duct 126 is an option, PAC introduction in exit duct 138 prior to air preheater 114 is preferred to increase mercury removal efficiency and reduce costs.

As illustrated in FIG. 2, both the fresh PAC and the recycled PAC are introduced at contact point 138a into the flow of flue gas through exit duct 138 prior to the flue gas reaching air preheater 114. From air preheater 114, the flue gas and entrained fresh and recycled PAC flow through fluidly connected duct 126 to a fluidly connected desulfurization unit 128. Desulfurization unit 128 comprises desulfurization spray dryer absorber 116 and first fabric filter 118. Desulfurization spray dryer absorber 116 and first fabric filter 118 are fluidly connected by means of duct 132. The flue gas entrained PAC flows through desulfurization unit 128 to complete the first stage reaction. For purposes of the first stage reaction whereby PAC absorbs flue gas mercury, both the fresh PAC and the recycled PAC have a median particle size (d50) less than approximately 15 microns, where d50 represents 50 percent of the particles by mass in the batch.

From desulfurization spray dryer absorber 116, flue gas flows through fluidly connected duct 132 to a fluidly connected fabric filter 118. An example of such a desulfurization unit is described in WO 96/16722, incorporated herein in its entirety by reference. WO 96/16722 discloses a method, in which lime-containing dust is mixed with water in a mixer and then introduced into a contact reactor to react with gaseous pollutants in flue gas flowing therethrough. The resultant dust including the chemically or physically converted gaseous pollutants is then separated in a filter, circulated to the mixer, and mixed again with water to be reintroduced into the contact reactor to repeat the process. This type of desulfurization spray dryer absorber is part of a moist dust fluid bed desulfurization unit.

After desulfurization spray dryer absorber 116, the flue gas flows through duct 132 to a fluidly connected first fabric filter 118. Fabric filter 118 captures the dried particulates entrained in the flue gas as the flue gas flows therethrough. Approximately 90 percent of mercury present in flue gas is captured in fabric filter 118.

As flue gas flows from fabric filter 118 through fluidly connected duct 130, fresh PAC is introduced into the flue gas via fluidly connected duct 146 from a fresh PAC supply 126 for a second stage reaction. Although fabric filter 118 has removed a majority of the mercury, via capture of the PAC on which the mercury is absorbed, a small amount remains in the flue gas. The present system provides for contact of the remaining mercury with a substantial amount of fresh carbon or PAC and then re-uses the same in the first fabric filter 118. As such, the fresh PAC from fresh PAC supply 126 adsorbs any mercury remaining in the flue gas. The flue gas with the PAC having mercury adsorbed thereon then flows through a second or last fabric filter 128.

The second or last fabric filter 128 is so named since system 110 has at least two, but may have more than two fabric filters depending on the composition of the flue gas and the emission control requirements. In the second or last fabric filter 128, almost all of the mercury remaining in the flue gas after the first fabric filter 118 is captured through the capture of the PAC. Since the PAC added to the second stage is an amount sufficient for both the first stage and the second stage reactions, the PAC available to adsorb mercury in the second stage reaction is far in excess of what is needed for purposes of mercury capture. Additionally, fly ash present in the flue gas from fuel combustion and like byproduct solids from the desulfurization unit 128 are captured in the first fabric filter 118 allowing the PAC captured in the second or last fabric filter 128 to be collected relatively free of contaminants. Following such mercury capture in the second or last fabric filter 128, the resultant cleaned flue gas flows out from the second or last fabric filter 128 via fluidly connected duct 148 to a fluidly connected stack 120. The cleaned flue gas flows through stack 120 for release into the atmosphere.

PAC from second or last fabric filter 128, having only absorbed a relatively small amount of mercury, has additional absorptive capacity and is collected and conveyed through fluidly connected duct 150 to recycled PAC supply 124. Since most mercury is captured in the first fabric filter 118, the fresh PAC from fresh PAC supply 126 remains largely unreacted when captured in second or last fabric filter 128. As such, the PAC from the second or last fabric filter 128 is ideal for purposes of recycling within system 110 for cost reduction.

A method of high performance mercury capture comprises introducing in a first stage reactor pulverized activated carbon and recycled pulverized activated carbon into a flue gas stream of a combustion system upstream of a desulfurization spray dryer absorber or a first fabric filter, capturing the pulverized activated carbon with flue gas mercury absorbed thereon from the flue gas stream in a first fabric filter downstream of the desulfurization spray dryer absorber, introducing in a second stage reactor pulverized activated carbon into the flue gas stream upstream of a second fabric filter, and capturing the pulverized activated carbon with remaining flue gas mercury adsorbed thereon from the flue gas stream in a second fabric filter to obtain cleaned flue gas acceptable for atmospheric release.

As an important note, PAC absorption efficiency may be affected by the presence of $SO_3$ contamination in the flue gas. $SO_3$ is present in some coals. As such, upon combustion of the coal, $SO_3$ present therein becomes another contaminant present in the flue gas produced as a result of the coal combustion. If $SO_3$ is present in the solid fuel or coal, rather than introducing the fresh PAC and the recycled PAC at contact point 138a into the flow of flue gas through exit duct 138, in order to achieve regulatory compliance, it may be necessary to introduce the fresh PAC and the recycled PAC at contact point 132a into the flow of flue gas through duct 132. By introducing the PAC in duct 132 after desulfurization spray dryer absorber 116, but before fabric filter 118, at least a portion of the $SO_3$ present in the flue gas is removed therefrom prior to PAC introduction therein. Removing at least a portion of any $SO_3$ present in the flue gas prior to PAC introduction into the flue gas, preserves the absorption efficiency of the PAC for mercury. By preserving the absorption efficiency of the PAC for mercury absorption, costs associated therewith are reduced. Accordingly, if a $SO_3$ containing solid fuel or coal is to be used for boiler 122, duct 140 may be rearranged (not shown) for fluid connection to duct 132 rather than to exit duct 138. As an alternative to rearranging the fluid connections of duct 140, an additional duct (not shown) may be arranged to fluidly connect ducts 142 and 144 to duct 132 thus allowing for system flexibility. With such flexibility, depending on the type of solid fuel or coal combusted, the PAC is either introduced in exit duct 138 via duct 140 or in duct 132 via the additional duct. As such, if $SO_3$ is not present in the fuel source, the system is controlled for PAC flow through ducts 142 and 144 to duct 140 for introduction into exit duct 138. If $SO_3$ is present in the fuel source, the system is controlled for PAC flow through ducts 142 and 144 to the additional duct (not shown) fluidly connected to duct 132 for PAC introduction into flue gas flowing through duct 132.

System control as noted above may be through manually controlled or remote computer controlled valves or dampers (not shown) arranged in duct 140 and the additional duct, to control PAC flow therethrough.

System operation should likewise be controlled in the presence of $H_2SO_4$ containing flue gas, or flue gas with like sulfur contaminants. Like $SO_3$ containing flue gas, $H_2SO_4$ containing flue gas may affect PAC absorption efficiency. As such, to preserve PAC absorption efficiency, PAC introduction following at least a portion of $H_2SO_4$ removal from the flue gas, is desirable. The same may be accomplished in the same manner as that described above for $SO_3$ containing flue gas.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A method for high performance mercury capture comprising:
   injecting pulverized activated carbon into a system with at least a first and a second fabric filter;
   collecting the activated carbon captured in the second fabric filter; and
   injecting the collected activated carbon from the second fabric filter upstream of the first fabric filter for reuse to capture mercury from process gas.

2. The method of claim 1 wherein said collected activated carbon from the second fabric filter is injected upstream of an air preheater.

3. The method of claim 1 wherein said collected activated carbon from the second fabric filter is injected into flue gas having a temperature of 400° F. to 1100° F.

4. The method of claim 1 wherein said collected activated carbon from the second fabric filter has a median particle size less than approximately 15 microns.

5. The method of claim 1 wherein the method is useful to capture greater than 90 percent flue gas mercury.

6. The method of claim 1 wherein the method is useful to capture approximately 99.8 percent or greater flue gas mercury.

7. A system for high performance mercury capture comprising:
   a desulfurization spray dryer absorber;
   a first fabric filter;
   a second fabric filter; and
   ductwork fluidly connected from the second fabric filter to a point upstream of the first fabric for flow of pulverized activated carbon opposite the flow of flue gas through the system for recycling of the pulverized activated carbon collected from the second fabric filter to a point upstream of the first fabric filter for reuse for carbon capture.

8. The system of claim 7 wherein the desulfurization spray dryer absorber is a part of a moist dust fluid bed desulfurization unit.

9. The system of claim 7 wherein said collected pulverized activated carbon from the second fabric filter is injected into a duct upstream of an air preheater.

10. The system of claim 7 wherein said collected pulverized activated carbon from the second fabric filter is injected into a duct with flue gas flow having a temperature of 400° F. to 1100° F.

11. The system of claim 7 wherein said collected pulverized activated carbon from the second fabric filter has a median particle size less than approximately 15 microns.

12. The system of claim 7 wherein the system is useful to capture greater than 90 percent flue gas mercury.

13. The system of claim 7 wherein the system is useful to capture approximately 99.8 percent or greater flue gas mercury.

14. The system of claim 7 wherein the system is useful to capture sulfur containing flue gas contaminants and greater than 90 percent of flue gas mercury.

15. The system of claim 7 wherein the system is useful to capture sulfur containing flue gas contaminants and approximately 99.8 percent or greater of flue gas mercury.

* * * * *